June 14, 1960   C. M. CARTER   2,940,203
FISHING LURE RETRIEVER
Filed Oct. 27, 1958
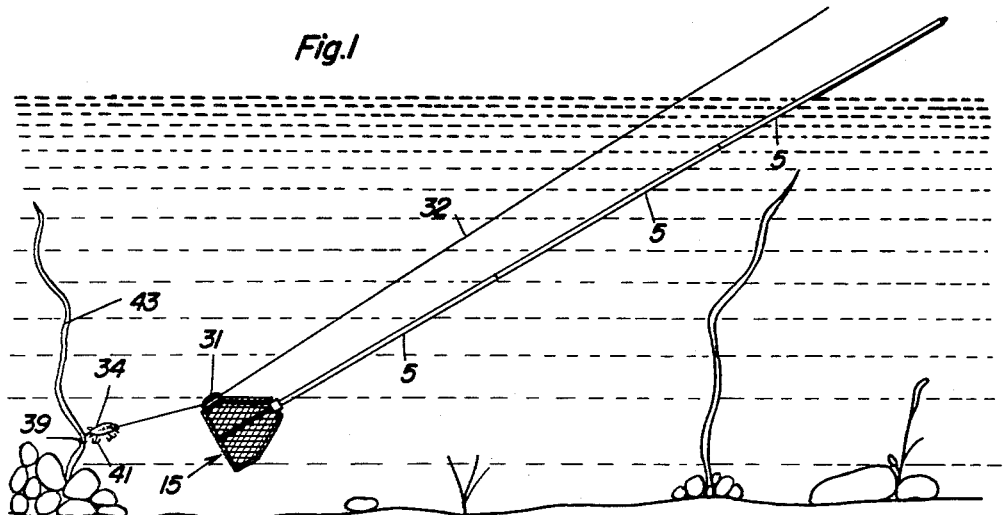
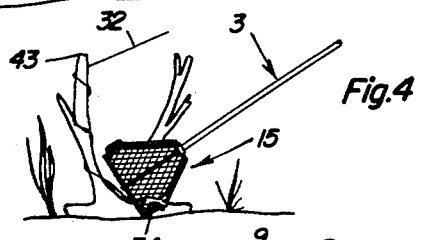
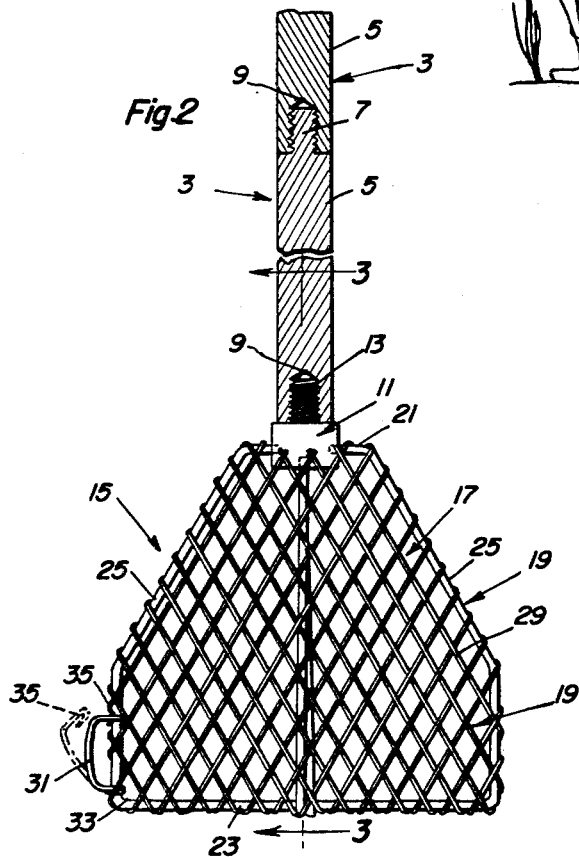
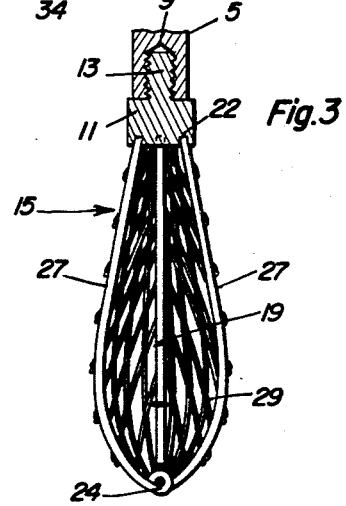
Carnie M. Carter
INVENTOR.

2,940,203
FISHING LURE RETRIEVER

Carnie M. Carter, 507 E. Main St., Waverly, Tenn.

Filed Oct. 27, 1958, Ser. No. 769,878

2 Claims. (Cl. 43—17.2)

This invention relates to improvements in fishing lure retrievers for freeing and recovering hook-type fishing lures with a hook or hooks which have become caught on rocks, weeds, or the like under water, or on bushes or trees at the bank of a stream because of poor casting.

The primary object of the invention is to provide for the above purposes a lure retriever embodying an elongated handle having an open mesh wire retriever head on one end thereof and which may be easily manipulated by the handle to catch into and interlock with such hooks to free such hooks either while on the line or when the line is broken.

Another object is to provide a lure retriever for the above purposes which is provided with means on the retriever head for guiding the retriever head along a line to a caught lure on a line to which the lure is attached.

Still another object is to provide a lure retriever in accordance with the foregoing in which the retriever head is readily visible under water.

Yet another object is to provide such a retriever which is strong, yet light in weight for easy manipulation and inexpensive manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in side elevation illustrating the lure retriever and the manner in which the same is guided along a line to a caught lure on the line;

Figure 2 is an enlarged fragmentary view of the lure retriever partly in side elevation and partly in longitudinal section and broken away;

Figure 3 is a fragmentary view in longitudinal section taken on the line 3—3 of Figure 2, and Figure 4 is a fragmentary view in side elevation illustrating the manner in which the lure retriever may be used in retrieving a lure on a caught broken line.

Referring to the drawing by numerals, the lure retriever of this invention comprises an elongated straight handle 3 which may include sections 5 detachably connected together by terminal screw plugs and sockets, as at 7, 9, respectively, so that handle 3 may be shortened or lengthened as desired, or taken apart. A cylindrical adapter 11 with a screw plug 13 thereon is threaded into the socket 9 in a front section 5 of said handle 3 for detachably attaching to one end of said handle 3 the retriever head designated generally by the numeral 15.

The retriever head 15 extends forwardly from the handle 3 coplanar therewith and is substantially bulbous and hollow with a rear portion 17 flaring forwardly to a substantially rectangular shaped front portion 19.

Further, the retriever head 15 is formed of a marginal polygonal rigid wire frame 19 having a rear end 21 suitably fixed transversely in the adapter 11 and extending from opposite sides of said adapter, a front end 23 parallel with and longer than the rear end 21, and obtuse angled sides 25 connecting said ends 21, 23. The frame 19 also includes a pair of oppositely outwardly bowed rigid brace wires 27 extended forwardly from the adapter 11 to the front wire 23 in the longitudinal center of the head 15 and which are suitably terminally attached to the adapter 11 and to the front end 23, as at 22, 24.

A diagonal, open mesh wire covering 29, or similar reticulated material, is stretched taut over the frame 19 and brace wires 27 and is suitably attached to said frame and brace wires. The frame 19, brace wires 27 and the covering 29 are formed of galvanized wire to render the retriever head visible under water to a substantial depth and in bushes, trees or the like, on a bank.

A U-shaped guide 31 is provided on one side 25 of the frame 19 adjacent a front corner of said frame for straddling a line 32 to which a lure 34 is attached and which is of resilient wire for flexing to position the same over said line 32 and attached at one end, as at 33, to one side 23 of the frame 19. A terminal hook 35 is provided on the other end of the guide 31 for engaging said side 25 of the frame 19 to releasably latch the guide to said frame 19 in straddling relation to the line 32.

In using the described retriever to retrieve a hook-equipped lure, or plug, 34 on a line 32, when a hook 39 on the lure or plug is caught under water 41 on a weed, or the like 43, and as shown in Figure 1, the guide 31 is engaged over the line 32 and the head 15 slid, by means of the handle 15 along the line 32 until it is sufficiently close to the caught lure 34 for manipulation by the handle 5 sidewise, or rotatably, or as may be found expedient to either interlock the caught hook 39 in the mesh of the covering 29 or with the frame 19 so that said hook may be freed, or to interlock with other hooks 41 on the line, not caught, so that the lure 34 may be freed by pushing or pulling against said lure. When the line 32 is caught on a weed 43, broken or unbroken, as shown in Figure 4, a lure 34 and the broken line may be retrieved and recovered by using the head 15 in substantially the same manner as previously described, without guiding on the line 32. Obviously, the retriever may be used substantially as described in the foregoing in freeing hook-equipped lures on lines from bushes or trees on stream banks, or from rocks in a stream.

The head 15 may be detached from the handle 3 and the sections 5 of the handle 3 detached from each other for compact arrangement for carrying or storing.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted, to falling within the scope of the invention as claimed.

What is claimed as new is as follows:

1. A retriever for freeing and recovering hook-equipped fishing lures caught by a hook thereof on a weed, rock or the like comprising an elongated handle having a front end provided with a forwardly extending head of reticulated material for interlocking with a hook of a caught lure to free the lure in response to manipulation of said head by said handle, said head comprising a frame of substantially rigid wire with a straight front end transverse to the handle and opposite sides attached to said handle and front end, a pair of opposite wire braces extending forwardly from said handle and terminally attached to said handle and to said front end in outwardly oppositely bowed relation, and wire mesh material covering said frame and braces and bowed outwardly of said frame by said braces to impart to said head a bulbous form.

2. A retriever according to claim 1, and a guide on one side of said frame for slidably engaging a line of a caught lure to guide said head to said caught lure in response to manipulation of said handle.

References Cited in the file of this patent

UNITED STATES PATENTS

| | | |
|---|---|---|
| 2,344,838 | Van Sickle | Mar. 21, 1944 |
| 2,467,269 | Miller | Apr. 12, 1949 |
| 2,493,100 | Adams | Jan. 3, 1950 |